(12) United States Patent
Spishak et al.

(10) Patent No.: US 9,352,435 B2
(45) Date of Patent: May 31, 2016

(54) MAGNET SENSING HOLE DRILLER AND METHOD THEREFOR

(71) Applicant: The Boeing Company, Chicago, IL (US)

(72) Inventors: Noel A. Spishak, Bellevue, WA (US); Charles M. Richards, Kent, WA (US); Jeff Hansen, Renton, WA (US); Stephen G. Moore, Renton, WA (US); Dan D. Day, Seattle, WA (US)

(73) Assignee: The Boeing Company, Chicago, IL (US)

( * ) Notice: Subject to any disclaimer, the term of this patent is extended or adjusted under 35 U.S.C. 154(b) by 169 days.

(21) Appl. No.: 13/931,165

(22) Filed: Jun. 28, 2013

(65) Prior Publication Data

US 2015/0003927 A1     Jan. 1, 2015

(51) Int. Cl.
*B23B 41/00* (2006.01)
*B23Q 9/00* (2006.01)
(Continued)

(52) U.S. Cl.
CPC .............. *B23Q 9/0007* (2013.01); *B23B 35/00* (2013.01); *B23B 39/14* (2013.01); *B25J 5/007* (2013.01); *B60B 19/003* (2013.01); *G05D 1/0261* (2013.01); *B23B 41/00* (2013.01); *B23B 49/00* (2013.01); *B23B 2260/018* (2013.01); *B60Y 2200/60* (2013.01); *B60Y 2200/80* (2013.01); *Y10T 29/53983* (2015.01);
(Continued)

(58) Field of Classification Search
CPC ..................... Y10T 408/556; Y10T 408/5612; Y10T 408/554; Y10T 408/91; B23B 39/14; B23B 41/00; B23B 41/16; B23B 49/00; B23B 2215/04; B23B 2260/102; B23B 2260/118

USPC .......................... 408/76, 77, 88, 234
See application file for complete search history.

(56) References Cited

U.S. PATENT DOCUMENTS 2,546,957 A * 3/1951 Ray ................................ 408/88
5,323,867 A * 6/1994 Griffin et al. .................. 180/22
(Continued)

FOREIGN PATENT DOCUMENTS

DE    102007016662 A1    10/2008
DE    102007016662 A1    10/2008
(Continued)

OTHER PUBLICATIONS

Replicating Success on Halosensor by Nathan A. Hulings Boeing Frontiers, Aug. 2012, vol. XI, Issue IV.
(Continued)

*Primary Examiner* — Daniel Howell
*Assistant Examiner* — Yasir Diab
(74) *Attorney, Agent, or Firm* — Miller, Matthias & Hull LLP

(57) ABSTRACT

A portable device to drill holes has a platform. A plurality of wheel sets is coupled to the platform. A drive system is used for driving the plurality of wheels. An attachment mechanism is positioned on an underside of the platform for securing the device to a surface. A control board is used for controlling the operation of the device. A drill spindle assembly is coupled to the platform. A drill feed assembly is coupled to the drill spindle assembly for raising and lowering the drill spindle assembly. A plurality of sensors are operable to sense one or more magnets disposed below the surface. A drive table is used for positioning the drill spindle assembly in an XY plane based on an output of said plurality of sensors.

18 Claims, 8 Drawing Sheets

(51) Int. Cl.
*B23B 35/00* (2006.01)
*B23B 39/14* (2006.01)
*B25J 5/00* (2006.01)
*B60B 19/00* (2006.01)
*G05D 1/02* (2006.01)
*B23B 49/00* (2006.01)

(52) U.S. Cl.
CPC .......... *Y10T 408/03* (2015.01); *Y10T 408/554* (2015.01); *Y10T 408/556* (2015.01); *Y10T 408/5612* (2015.01)

(56) References Cited

U.S. PATENT DOCUMENTS

| | | | | |
|---|---|---|---|---|
| 5,468,099 | A * | 11/1995 | Wheetley et al. | 408/1 R |
| 6,129,489 | A * | 10/2000 | Linderholm | 409/178 |
| 6,296,426 | B1 * | 10/2001 | King et al. | 408/76 |
| 6,926,094 | B2 * | 8/2005 | Arntson et al. | 173/32 |
| 6,927,560 | B2 | 8/2005 | Pedigo et al. | |
| 7,137,760 | B2 * | 11/2006 | Boyl-Davis et al. | 408/1 R |
| 7,289,873 | B2 * | 10/2007 | Redecker et al. | 700/174 |
| 7,498,796 | B2 | 3/2009 | Georgeson et al. | |
| 7,768,249 | B2 | 8/2010 | Georgeson et al. | |
| 7,768,250 | B2 | 8/2010 | Georgeson et al. | |
| 8,019,472 | B2 * | 9/2011 | Montero SanJuan | B21J 15/14 180/8.1 |
| 2003/0108395 | A1 * | 6/2003 | Douglas et al. | 408/76 |
| 2004/0265081 | A1 * | 12/2004 | Buttrick, Jr. | 408/76 |
| 2005/0052898 | A1 * | 3/2005 | Arntson | 365/154 |
| 2011/0210720 | A1 * | 9/2011 | Corry | 324/207.13 |
| 2011/0243676 | A1 * | 10/2011 | Marguet et al. | 408/72 R |

FOREIGN PATENT DOCUMENTS

| | | |
|---|---|---|
| DE | 102011052602 A | 11/2012 |
| DE | 102011052602 A1 | 11/2012 |
| EP | 1132164 A2 | 9/2001 |
| EP | 1132164 A2 | 9/2001 |
| EP | 1792673 A2 | 6/2007 |
| EP | 1792673 A2 | 6/2007 |
| EP | 2239088 A1 | 10/2010 |
| EP | 2239088 A1 | 10/2010 |
| FR | 2809034 A | 11/2001 |
| GB | 2363462 A | 12/2001 |
| GB | 2363462 A | 12/2001 |
| JP | 2008179187 A | 8/2008 |
| JP | 2008179187 A | 8/2008 |

OTHER PUBLICATIONS

International Search Report for related International Application No. PCT/US2014/038699; report dated Jan. 7, 2016.

* cited by examiner

MAGNET SENSING HOLE DRILLER AND METHOD THEREFOR

BACKGROUND

Embodiments of this disclosure relate generally to a manufacturing device, and more particularly, to a portable, Computer Numerical Control (CNC) machine that moves along assembly surfaces to drill holes.

It may be desirable to locate, with a certain degree of accuracy and specificity, locations in a blind area of a working surface. For example, if it is desired to affix together two portions of a structure, where only an outside surface is visible to a work person, it may be difficult to precisely and reproducibly place a fastener between the two portions. This may be particularly relevant in regards to aircraft where the skin of the aircraft may be placed over an internal frame structure and affixed thereto. In the above case, once the skin is in place, it may be difficult to locate a fastener that may first go through the skin to be affixed to the internal structure of the aircraft. This situation arises in other construction and manufacturing instances as well.

Presently, one solution has been the attempt to back drill from inside the structure. In the above aircraft scenario, it may be a common practice to back drill the wing skin holes from inside the wing using pre-drilled holes in ribs and spars as the templates. However, this may lead to off-angle holes and subsequent required rework.

During back drilling, a work person physically places themselves inside the structure, often in areas where spacing may be tight. The person then drills through the sub-structure and through the skin. This, however, may create impreciseness in the holes. Furthermore, it may be hard on the work person who may have crawl or reach into small areas to create the holes.

Backmarkers may also be used in the aircraft industry to transfer holes from the understructure to the outside surface. Backmarkers may consist of a long split piece of thin metal with a pin on one side and a hole on the other that are in alignment. The pin side may be slipped under the skin to line up with a pilot hole in the understructure, and a pilot hole is drilled into the outer skin. However, deflection of the split plates and the difficulty of installing the device on thick parts may limit the use to thin areas near the edge of the skin.

Another method may be to use a probe or locating device to determine a precise position on the skin. The probe is generally programmed with locations in three dimensional space. When a surface is placed within reach of the probe, the probe can determine the location of a point which the probe touches. This, however, requires an extensive pre-programming and precise placement of the surface to be probed. Using such special orientation probes increases time and manufacturing costs for many applications.

Therefore, it would be desirable to provide a system and method that overcomes the above.

SUMMARY

A portable device to drill holes has a platform. A plurality of wheel sets is coupled to the platform. A drive system is used for driving the plurality of wheels. An attachment mechanism is positioned on an underside of the platform for securing the device to a surface. A control board is used for controlling operating of the device. A drill spindle assembly is coupled to the platform. A drill feed assembly is coupled to the drill spindle assembly for raising and lowering the drill spindle assembly. A plurality of sensors is operable to sense one or more magnets disposed below the surface. A drive table is used for positioning the drill spindle assembly in an XY plane based on an output of the sensors.

A portable device for use in product assembly has a platform. A plurality of wheel sets is coupled to the platform. A drive system is sued for driving the plurality of wheel sets. An attachment mechanism is used for securing the device to a surface for an assembly operation. A plurality of sensors is used for finding a location on the surface where the assembly operation is to be performed based on detection of at least one magnet positioned under the surface. A normality system is used for adjusting an angle between the platform and the surface where the assembly operation is to be performed.

A process for operating a portable autonomous device to drill holes comprising: transmitting a signal to the portable autonomous device to move to a drill location on a surface; receiving a location update from the portable autonomous device; determining whether the updated location is the drill location; aligning a drill assembly of the portable autonomous device the drill location; activating an attachment device of the portable autonomous device to fix a position of the portable autonomous device; activating magnet sensors and an XY drive to locate a magnet; and activating a drill feed assembly of the portable autonomous device to lower the drill assembly.

The features, functions, and advantages may be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
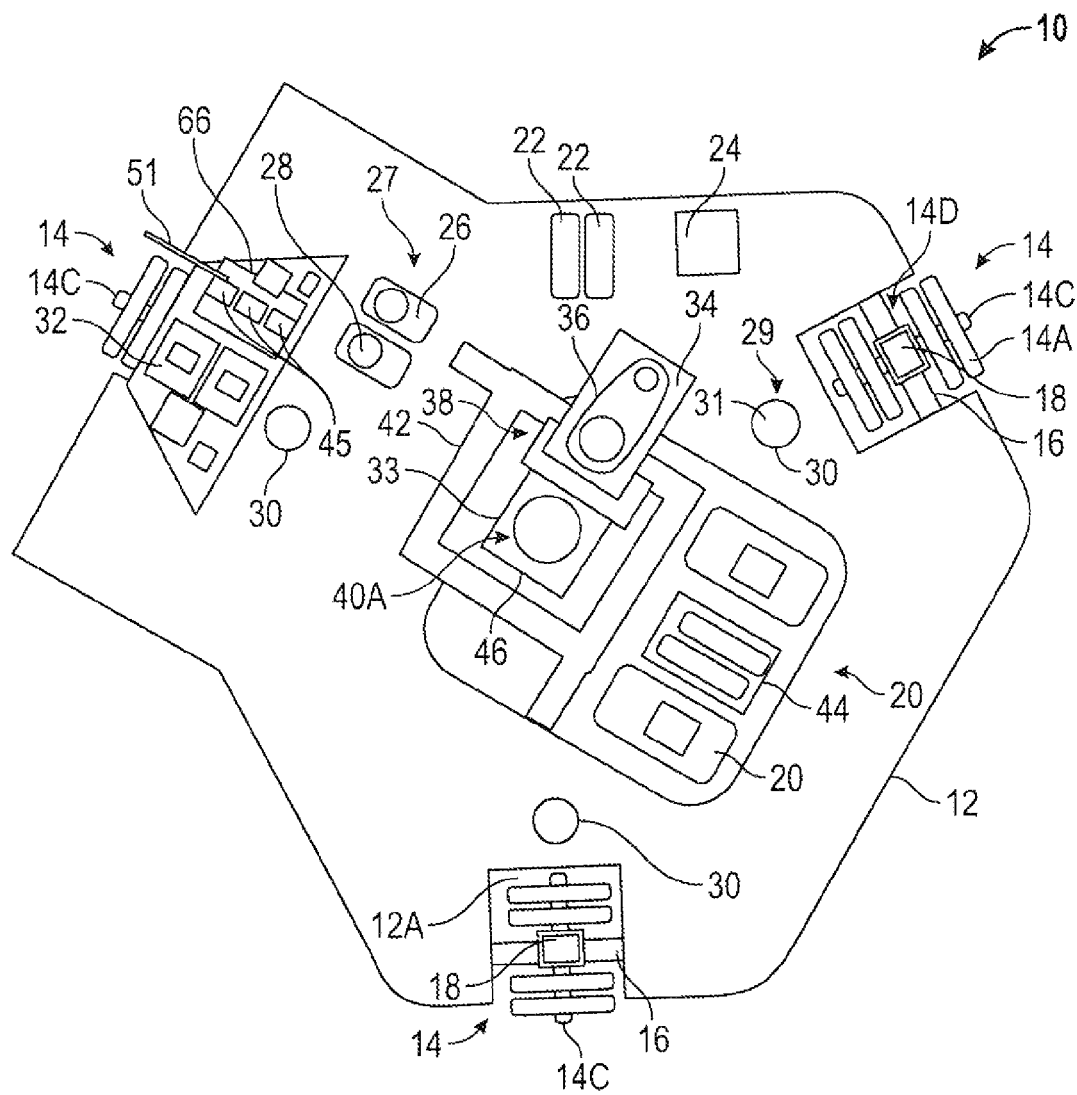
FIG. 1 illustrates a top schematic view of a magnetic sensing hole driller.
Figure 2:
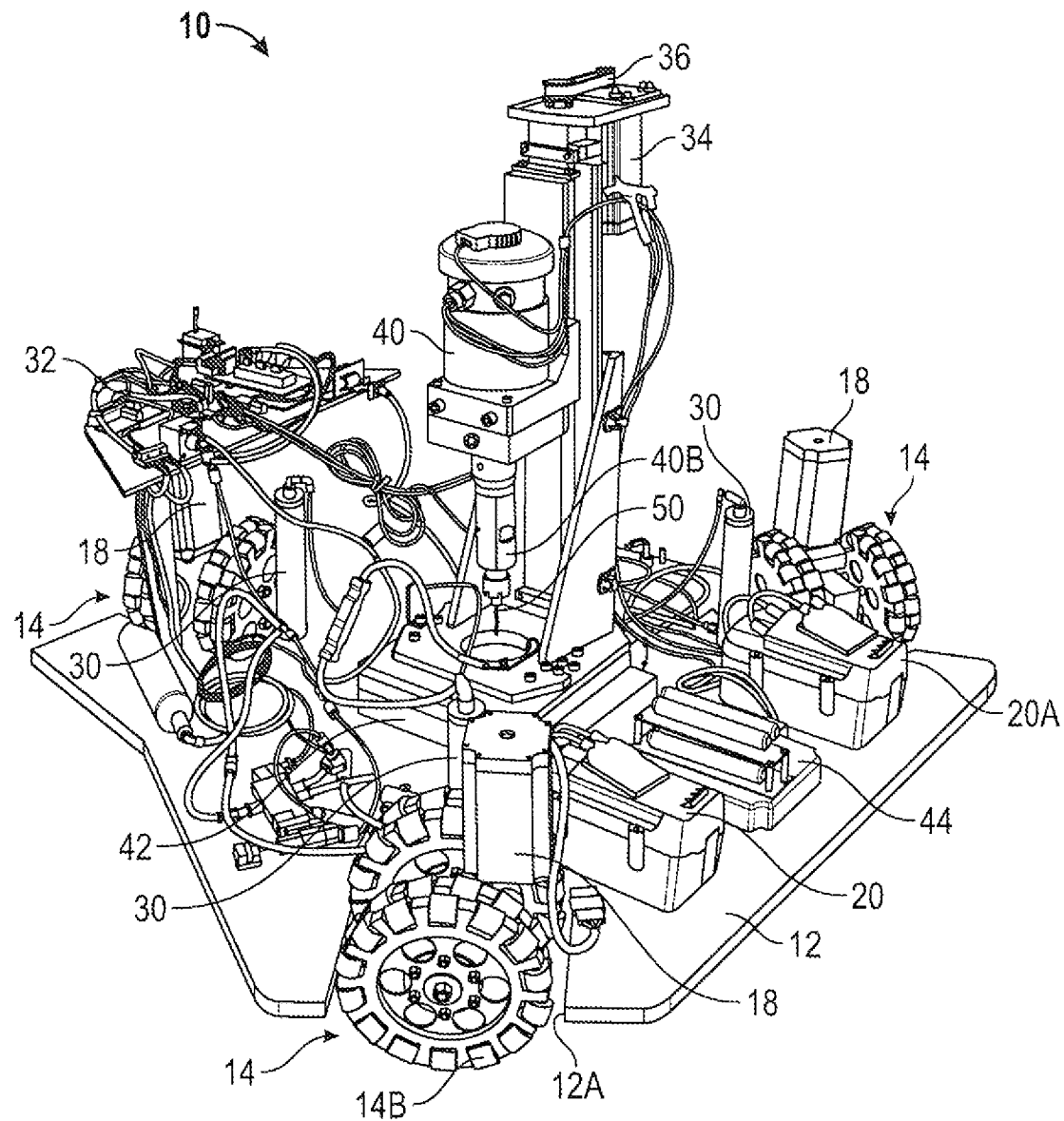
FIG. 2 illustrates a perspective view of the magnetic sensing hole driller.

Referring now to FIGS. 1 and 2, an embodiment of a magnet sensing hole drilling device 10 (hereinafter device 10) is shown. The device 10 may be configured as a portable, mobile, autonomous computer numerical control (CNC)

machine that may move along assembly surfaces to drill initial holes, the locations of which may be determined via a coordinate measurement system, and whose positions may be refined using a magneto-resistive sensor that senses a temporary magnet in the part. While the device 10 is described below as being used as a drill, the device 10 may be useful in a wide range of areas besides drilling, such as inspection, photographing, applying sealant or adhesive, painting, cleaning or anything requiring a compact autonomous device on a large structure.

The device 10 may have a platform 12. The platform may be used to support a plurality of components of the device 10. While the platform 12 shown in FIGS. 1 and 2 is triangular in shape, the platform 12 may be formed in other shapes without departing from the spirit and scope.

Attached to the platform 12 is a plurality of wheel sets 14 for moving the device 10. While the present embodiment shows three wheel sets 14, this is shown as one example and should not be seen in a limiting manner. The wheel set 14 may be formed of one or more wheels 14A, an axle 14C between the wheels, a gearbox 14D, and an independent drive system 18. The wheel set 14 may be attached to a wheel pivot assembly 16. The wheel pivot assembly 16 attaches to platform 12 and allows the wheel set 14 to rotate about the wheel pivot assembly 16 so that all wheels 14A will maintain contact with the surface. In the embodiment shown in FIGS. 1 and 2, each wheel set 14 has two pairs of wheels 14A for a total of four wheels 14A per wheel set 14.

Any type of wheel 14A may be used in the wheel set 14. In accordance with one embodiment, the wheel sets 14 may be comprised of one or more Omni wheels. Omni wheels are a type of wheel which may have small discs 14B formed around a circumference of the wheel 14A. The discs 14B may be formed perpendicular to the rolling direction. The effect is that each wheel 14A with the discs 14B may roll with full force, but can also slide laterally with great ease.

Figure 3:
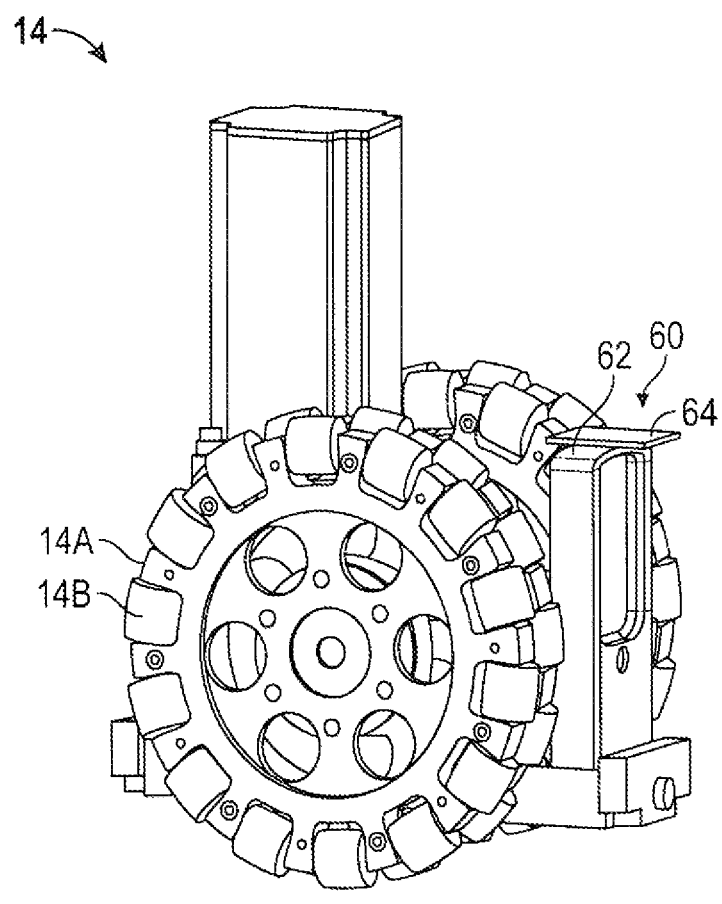
FIG. 3 is a magnified perspective view of a wheel pivot assembly used in the magnetic sensing hole driller.
Figure 4:
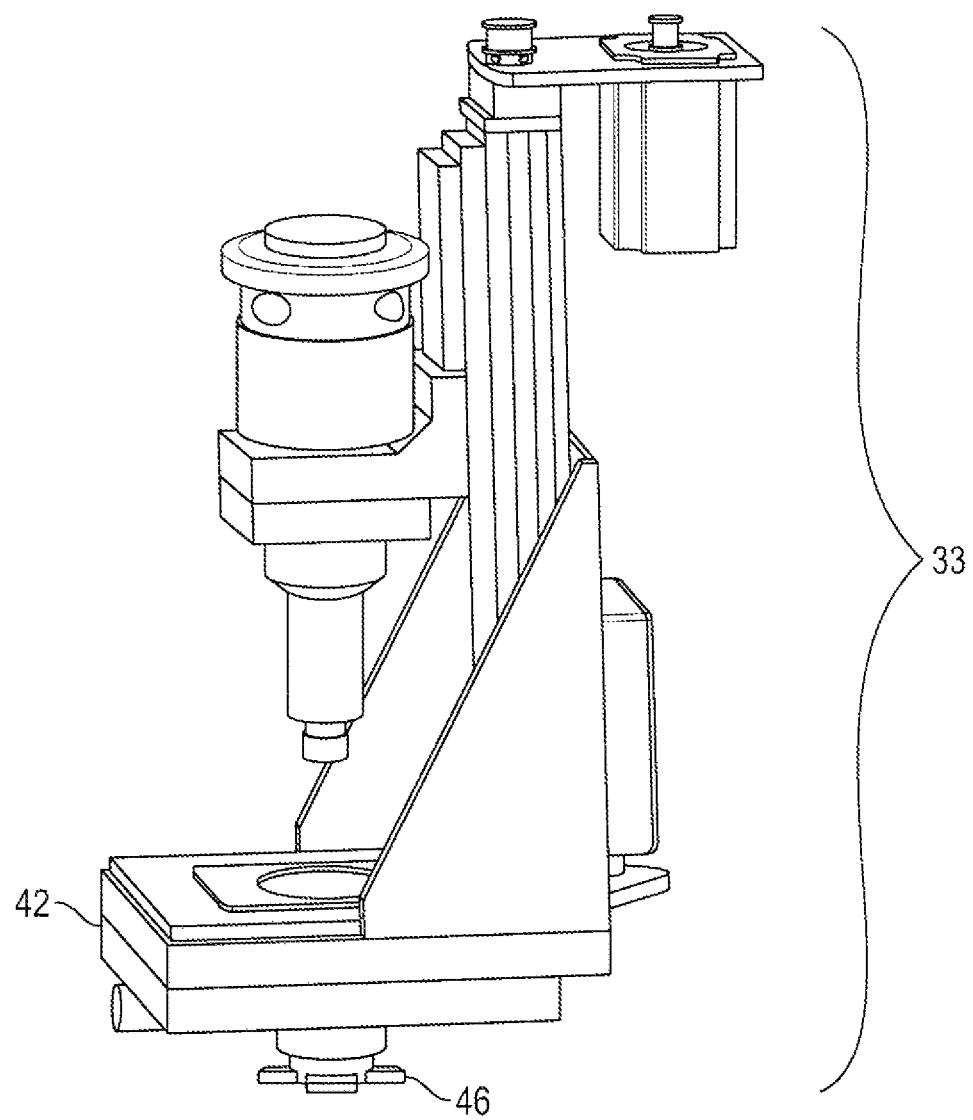
FIG. 4 is a magnified perspective view of the drill assembly used in the magnetic sensing hole driller.
Figure 5:
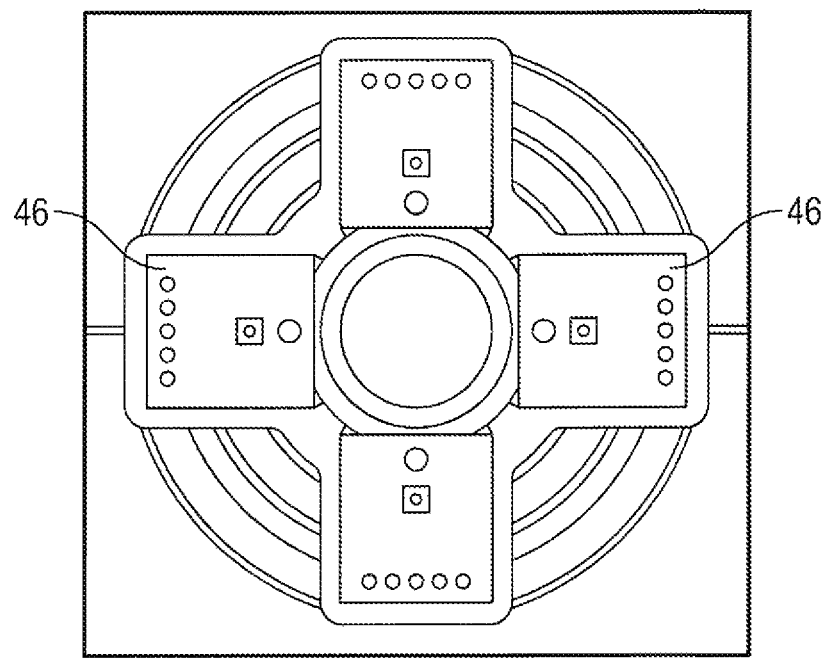
FIG. 5 is a bottom view of the sensors used in the magnetic sensing hole driller.
Figure 6:
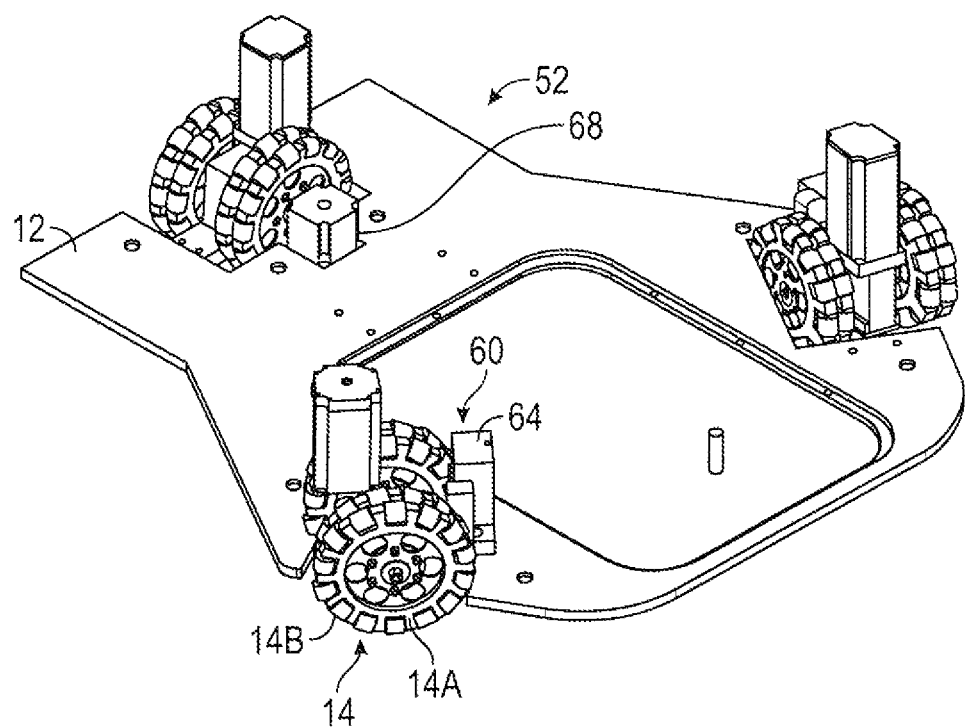
FIG. 6 is a perspective view of the platform and wheel pivot assembly of the magnetic sensing hole driller.

As may be seen in FIG. 3, the wheel sets 14 may be designed so both pairs of wheels 14A in each wheel set 14 remain in contact with the surface. This may be accomplished by allowing the wheel sets 14 to pivot about an axis Pivot CL. This pivoting ensures that all four wheels 14A are on the surface and this enables the device 10 to maintain normality and traction.

Referring back to FIGS. 1 and 2, in the embodiment shown in FIGS. 1 and 2, the wheel sets 14 may be attached at the vertices of the platform 12. However, this is shown as an example and should not be seen in a limiting manner. The wheel sets 14 may be attached to the platform 12 in different manners. As shown in the present embodiment, cut-outs 12A may be formed in the platform 12. The wheel pivot assembly 16 may be coupled across the cut-out 12A such that the wheel sets 14 may be positioned within the cut-out 12A.

The wheel sets 14 may be driven by a drive system 18. In accordance with one embodiment, each wheel set 14 may be driven by an independent drive system 18. The drive system 18 may be comprised of an independent motor and gear system or the like. The above description of the drive system 18 is shown as an example and should not be seen in a limiting manner.

The device 10 may have a power source 20. The power source 20 may be used to power the different components of the device 10. In accordance with one embodiment, the power source 20 may be batteries 201. Additional embodiments may have an electrical cable to supply the device 10 with power, or solar cells may be used as a charging/power source. The power source may be coupled to one or more DC converters 22. The DC converters 22 may be used to adjust the voltage applied to the different components of the device 10. A switch 24 may also be coupled to the power source 20. The switch 24 may be used to control the energization of the device 10.

The device 10 may have an attachment mechanism 29 to secure the device 10 to a manufacturing surface and hold the device 10 steady during the drilling process. In accordance with one embodiment, the attachment mechanism 29 may be comprised of suction cups 31 positioned on the underside of the platform 12. The suction cups 31 may be coupled to vacuum system 27 that controls air flow to the suction cups 31. The vacuum system 27 may be comprised of an air pump 26 and vacuum pump 28 which controls airflow to air cylinders 30 that are in fluid communication with the suction cups 31.

The device 10 may have a drill assembly 33 for drilling holes. In accordance with one embodiment, the drill assembly 33 may have a drill spindle assembly 40 consisting of a spindle motor 40A and a drill spindle 403 for holding a drill bit 50. In other embodiments an assembly tool other than drill spindle assembly 40 may be utilized with device 10. A spindle motor 40A may be used to power and rotate the drill spindle 40B. The above is given as one example of the drill assembly 33 and should not be seen in a limiting manner. A spindle control 44 may be coupled to the drill assembly 33 to control the drill speed.

The drill assembly 33 may be coupled to a drill feed assembly 38. The drill feed assembly 38 may be used to raise and lower the drill spindle assembly 40. The drill feed assembly 38 may be coupled to a drill feed motor 34. The drill feed motor 34 may be used to raise and lower the drill spindle assembly 40. A drill feed belt 36 may be coupled to the drill feed motor 34 and the drill feed assembly 38. The drill feed belt 36 may be used to transfer power from the drill feed motor 34 to the drill feed assembly 38 to raise and lower the drill spindle assembly 40.

The drill assembly 33 and drill feed assembly 38 may be mounted on a drive table 42. The drive table 42 may be used to move the drill assembly 33 in an XY plane. Thus, the drive table 42 may be used for fine positioning of the drill assembly 33 and the drill bit 50 over a desired area.

The device 10 may have sensors 46. The sensors 46 may be mounted under the XY drive table 42 and move with the XY drive table 42. The sensors 46 may be used for detecting drill location. In accordance with one embodiment, the sensors 46 may be magnetic sensors which may be used for detecting drill location magnets that may be prepositioned under a work surface to which the device 10 is attached and operating.

Referring now to FIGS. 1-5, in accordance with one embodiment, the sensors 46 may be magnetoresistive. Thus, the sensors 46 may divide the output field strength into X, Y & components. One or more microprocessors 45 on a control board described below may be used to process the field strength readings and command the XY drive table 42 to move until it determines the magnet that is located under the wing surface is centered beneath the sensors 46. Knowing the X, Y & components of magnetic strength and direction enable the microprocessor 45 to not only find the center of the magnet, but also determine the magnet depth and polar alignment. From that information a quality check can be made to ensure proper magnet installation prior to drilling.

The device 10 may have a control board 32. The control board 32 may have one or more microprocessors 45 and memory for storing software or firmware for operating the device 10, as well as for error detection and tracking assembly performance and quality metrics. The control board 32 may also control a fastener insertion system, and a drill normality system 52 that detects and aligns the drill assembly 33. An antenna 51 may be in communication with the control board 32 to send and receive wireless control signals to and from the control board 32.

Referring now to FIGS. 1-9, the normality system 52 will be described in more detail. The normality system 52 may be used to raise and lower the platform 12 to achieve a proper drill angle to the surface. As may be seen in FIG. 6, the drill assembly 33 may need to be positioned outside of a line drawn between two front wheel sets 14. The position of the drill assembly 33 may allow drilling along an edge of a curved surface such as a wing panel or the like. However, moving the drill assembly 33 outside of the line drawn between two front wheel sets 14 may require a system to sense and adjust the device's normality to the curved surface. On a curved surface the wheel sets 14 may pivot. Thus, the angle of the pivot may need to be determined in order to achieve a proper drill angle.

To measure the pivot of the wheel sets 14, a pivot angle measuring device 60 may be coupled to the platform 12. In accordance with one embodiment, the pivot angle measuring device 60 may be formed of sensors 62 mounted on the two front wheel sets 14 and encoders 64 mounted on the platform 12. The encoders 64 may take data measured by the sensors 62 to calculate the pivot angle. With the geometry of the wheel set 14 and the angle of the pivot one can determine the angle the platform 12 may need to be raised or lowered to achieve the proper drill angle to the surface.

A control unit 66 of the normality system 52 takes readings from the pivot angle measuring device 60 and calculates the angle the platform 12 may need to be raised or lowered to achieve the proper drill angle to the surface. Once the calculations are determined, the control unit 66 may send signals to a normality motor 68. The normality motor 68 may pull or push on a swing arm 70 which may be attached to the wheel set 14 coupled to a rear section of the platform 12. The swing arm 70 may raise or lower the platform 12 to achieve a proper drill angle to the surface. The control unit 66 may be programmed to have a predefined tolerance. Thus, unless the angle the platform 12 needs to be raised or lowered more than a predefined amount, for example more than 1 degree, the normality system 52 may be programmed not to move the swing arm 70.

Figure 7:
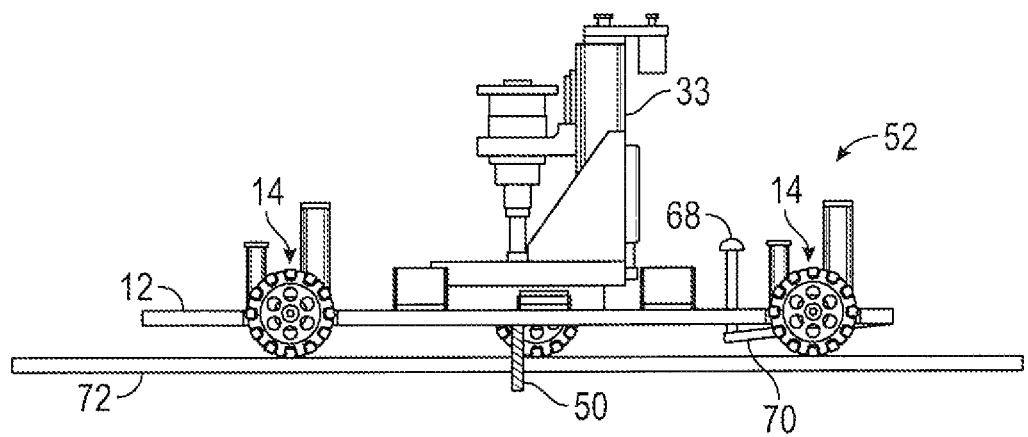
FIG. 7 is a simplified block diagram showing one embodiment of operation of the normality system used in the magnetic sensing hole driller.
Figure 8:
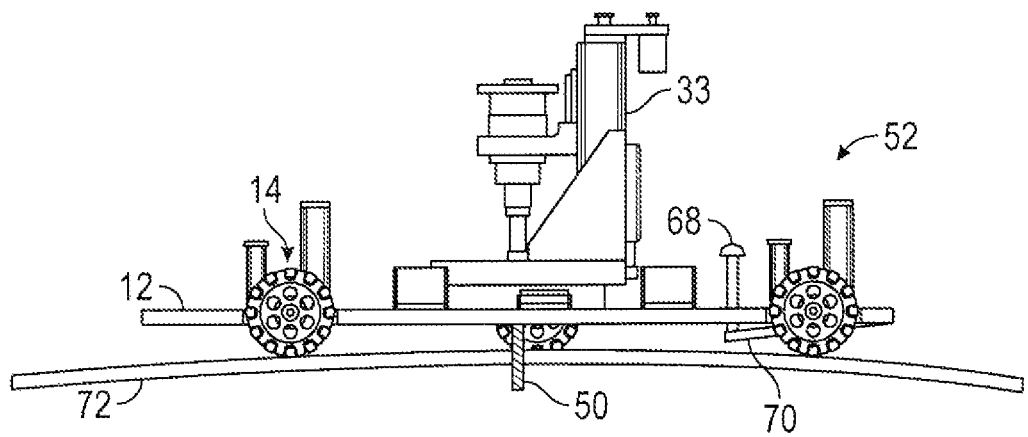
FIG. 8 is a simplified block diagram showing one embodiment of operation of the normality system used in the magnetic sensing hole driller.
Figure 9:
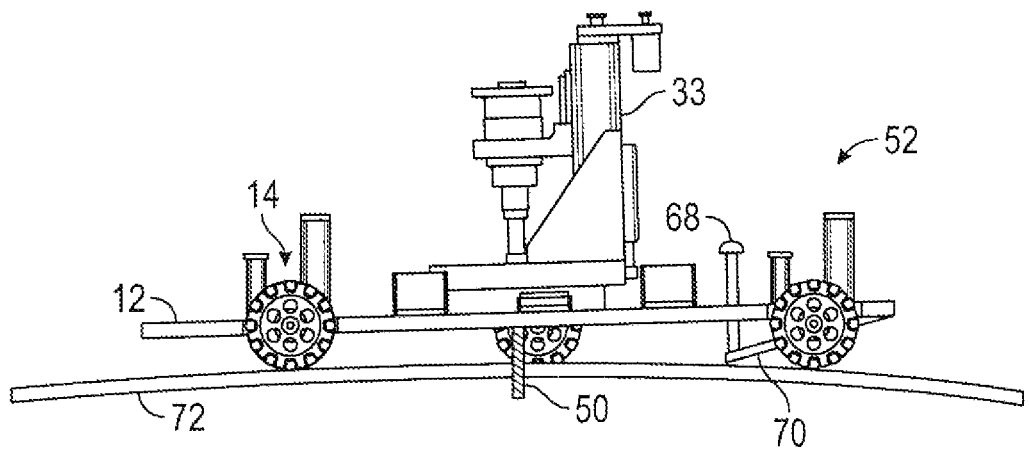
FIG. 9 is a simplified block diagram showing one embodiment of operation of the normality system used in the magnetic sensing hole driller.

The control unit 66 may have one or more microprocessors 45 programmed to cause the device 10 to perform the various operations described herein. While the Figures may show 5 microprocessors 45, this is only shown as an example and should not be seen in a limiting manner. Referring to FIG. 7-9, operation of the normality system 52 is shown. In FIG. 7, the normality system 52 determines that the device 10 is on a surface 72 that is level. Thus, the normality system 52 does not have to raise or lower the platform 12 to achieve a proper drill angle to the surface 72.

In FIG. 8, the normality system 52 determines that the device 10 is on a surface 72 that is slightly curved. The normality system 52 calculates the angle between the platform 12 and the wheel set 14. In this embodiment, the normality system calculates that the angle is still within a predefined tolerance (for example, the platform 12 is still within 1 degree of being perpendicular to the surface 72). Thus, the normality system 52 does not have to raise or lower the platform 12 to achieve a proper drill angle to the surface 72.

In FIG. 9, the normality system 52 determines that the device 10 is on a surface 72 that is also slightly curved. The normality system 52 calculates whether the angle between the platform 12 and the wheel set 14 exceeds the predefined tolerances. Thus, the normality system 52 sends signals to raise or lower the platform 12 to achieve a proper drill angle to the surface 72.

Figure 10:
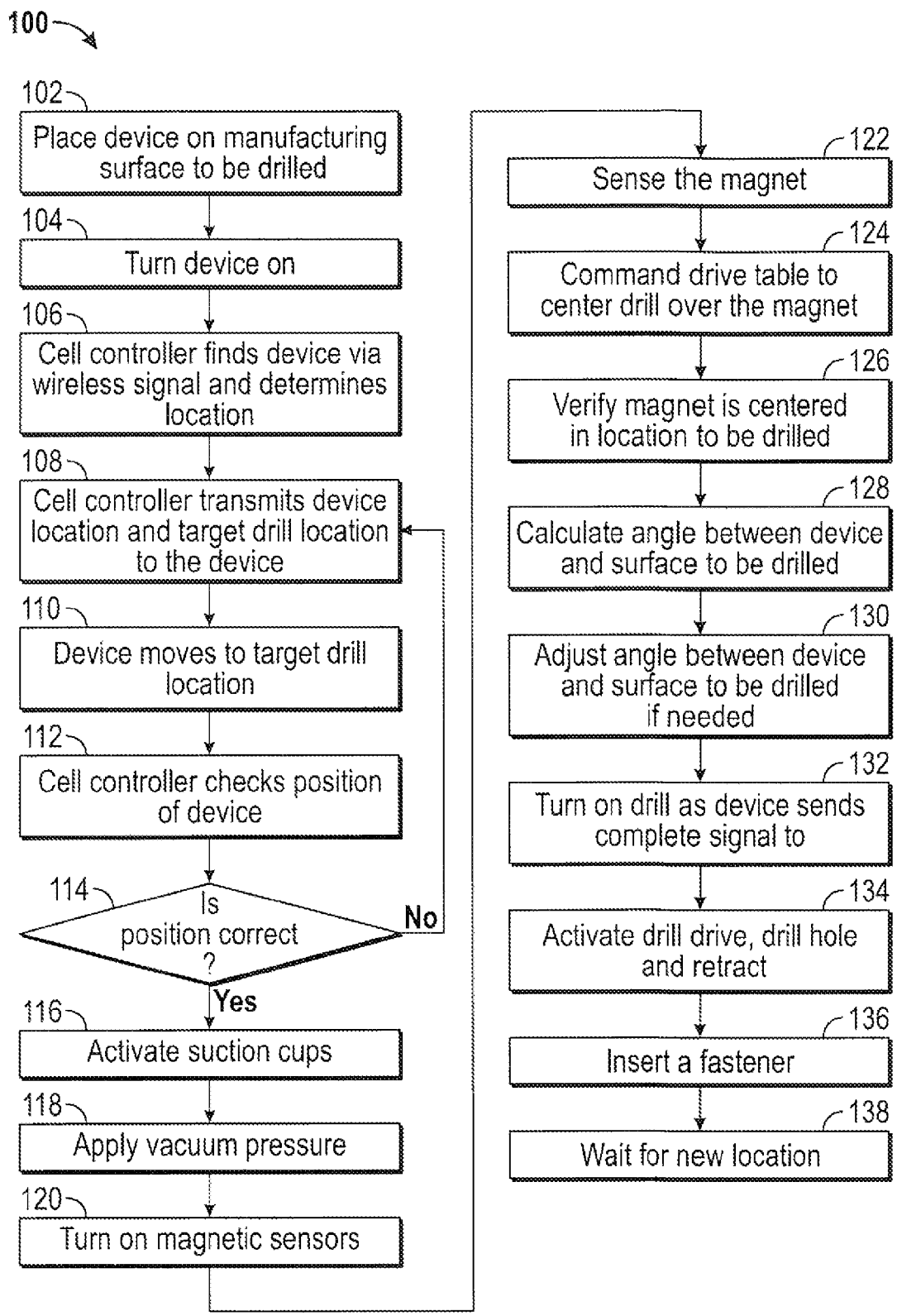
FIG. 10 illustrates a flowchart of a method of using an embodiment of the magnetic sensing hole driller.

Referring to FIGS. 1-11 a method of using the device will be described. FIG. 10 illustrates a flowchart of a method 100 of using an embodiment of the autonomous magnetic hole driller according to an embodiment of the invention. The method 100 may start at step 102 by placing the device 10 on a surface to be drilled or treated and activating the device 10 (step 104). At step 106, upon activating the device 10, the device 10 may transmits a wireless signal via the antenna 51 that may be used to find and determine the location of the device 10. At step 108, a cell controller (not shown) may transmit the current location of the device 10 and a target location to be drilled to the device 10. At step 110, the device 10 may move to the target drill location. At step 112, the cell controller may check the position of the device 10 and determines if the position of the device 10 is correct.

If the position is not correct, the cell controller may retransmit the current location of the device 10 and the desired drill location. If the position of the device 10 is correct, the suction cups 31 may be activated by applying vacuum pressure to fix the position of the AMSHD (steps 116 and 118). At step 120, the magnetic sensors may be turned on to find the precise position of the temporary magnet that is located in the position of the hole to be drilled. At step 122, the device 10 senses the temporary magnet, and the control board 32 may send commands to the drive table 42 to center the drill assembly 33 over the magnet (step 124). At step 126, the position of the device 10 may be confirmed again. The angle between the platform 12 and the surface 72 to be drilled may be calculated at step 128 by using the normality system 52. If the angle calculated exceeds a predetermined threshold value, the normality system 52 may be used to adjust the angle between the platform 12 and the surface 72 as shown in step 130. Once the correct position of the device 10 has been verified, the drill assembly 33 may be activated (step 132). At step 134, the drill bit 50 may be lowered into contact with the manufacturing surface, the hole may then be drilled, and the drill bit 50 can be retracted. At step 136, a fastener may then be inserted (step 134). At step 138, the device 10 may then await further location positioning commands.

Figure 11:
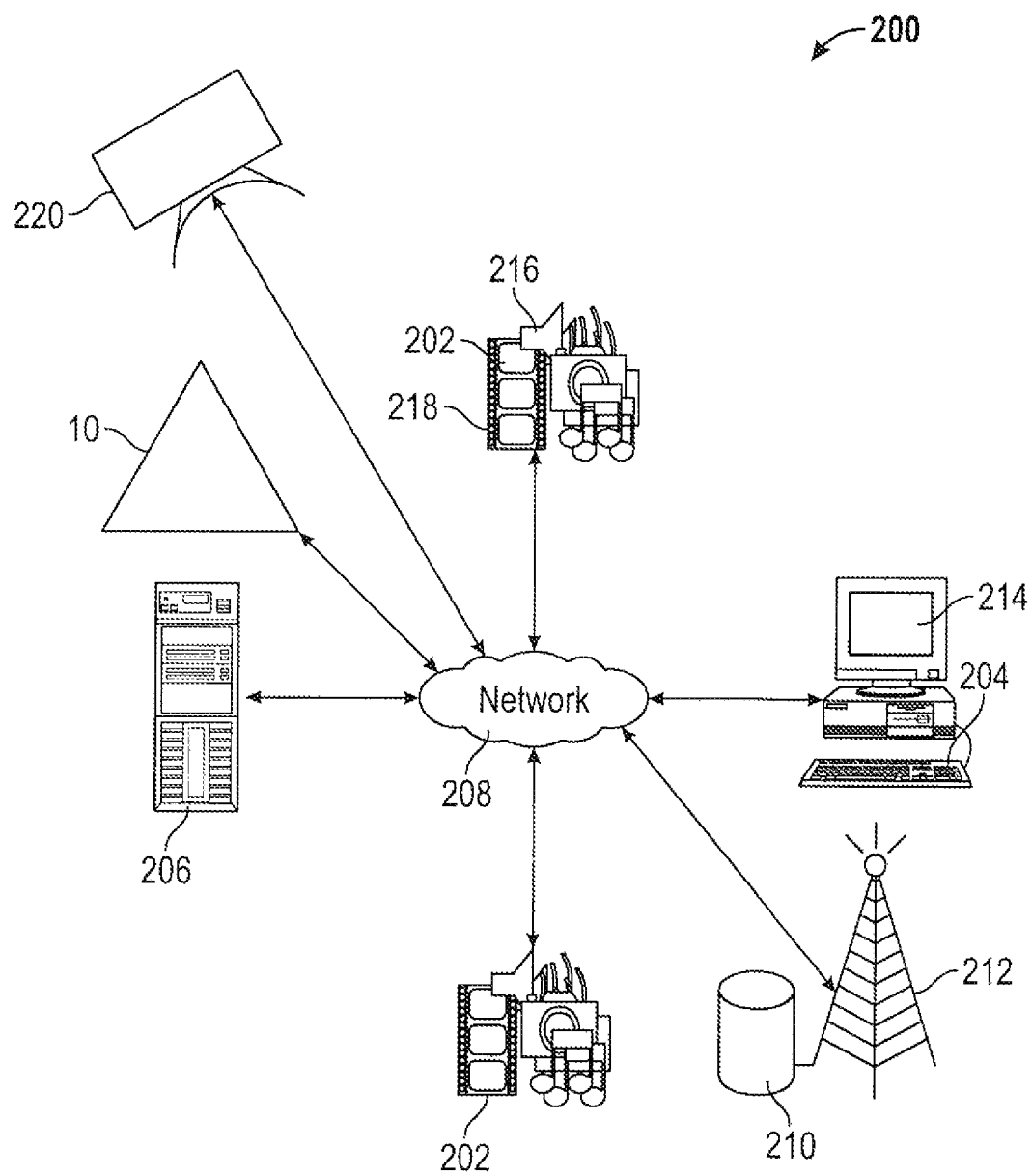
FIG. 11 is a schematic diagram illustrating an overall view of communication devices, computing devices, and mediums for implementing the magnetic sensing hole driller.

FIG. 11 is a schematic diagram illustrating an overall view of communication devices, computing devices, and mediums for implementing an autonomous magnetic hole driller according to embodiments of the invention. The system 200 may include multimedia devices 202 and desktop computer devices 204 configured with display capabilities 214. The multimedia devices 202 may be mobile communication and entertainment devices, such as cellular phones and mobile computing devices that may be wirelessly connected to a network 208. The multimedia devices 202 may have video displays 218 and audio outputs 216. The multimedia devices 202 and desktop computer devices 204 can be optionally configured with internal storage, computing processors, software, and a graphical user interface (GUI) for carrying out elements of the device 10 according to embodiments of the invention. The network 208 is optionally any type of known network including a fixed wire line network, cable and fiber optics, over the air broadcasts, satellite 220, local area network (LAN), wide area network (WAN), global network (e.g., Internet), intranet, etc. with data/Internet capabilities as represented by server 206. Server 206 may be configured as a cell controller (Vicon) for controlling and positioning the device 10. Communication aspects of the network may be represented by cellular base station 210 and antenna 212. In accordance with one embodiment, the network 208 is a LAN and each remote device 202 and desktop device 204 may execute a user interface application (e.g., Web browser) to contact the server system/cell controller 206 through the network 208. Alternatively, the remote devices 202 and 204 may be implemented using a device programmed primarily for accessing network 208 such as a remote client.

The software for the operation of device 10, of embodiments of the invention, may be resident on the individual multimedia devices 202 and desktop computers 204, device 10 or stored within the server/cell controller 206 or cellular base station 210.

While embodiments of the disclosure have been described in terms of various specific embodiments, those skilled in the art will recognize that the embodiments of the disclosure may be practiced with modifications within the spirit and scope of the claims.

What is claimed is:

1. A portable device to drill holes comprising:
   a platform;
   a plurality of wheel sets coupled to the platform, the plurality of wheel sets engaging and moving the portable device along a surface to be drilled;
   a drive system for driving the plurality of wheels;
   an attachment mechanism positioned on an underside of the platform for securing the device to the surface;
   a control board for controlling operating of the device;
   a drill assembly coupled to the platform;
   a drill feed assembly coupled to the drill assembly for raising and lowering the drill spindle assembly;
   a drive table for positioning the drill assembly in an XY plane;
   a power supply for powering the device;
   an antenna coupled to the control board for sending location information and receiving drill locations;
   sensors for finding magnet locations identified by a magnet separate from the portable device; and
   wherein the control board receives target signals and moves the portable device to a target drill location on the surface, the control board adjusting an angle between the platform and the surface based on readings from the sensors.

2. The device of claim 1, further comprising a normality system for adjusting the angle between the platform and the surface to be drilled.

3. The device of claim 2, wherein the normality system comprises:
   a pivot angle measuring device;
   a control unit coupled to the pivot angle measuring device; and
   a normality motor coupled to the control unit for raising and lowering a portion of the platform.

4. The device of claim 2, wherein the normality system has a plurality of multi-core processors, wherein each core of each processor is programmed to perform a specific function.

5. The device of claim 1, wherein each wheel set comprises:
   a wheel pivot assembly attached to the platform; and
   at least one wheel rotatably coupled to the wheel pivot assembly.

6. The device of claim 5, wherein the at least one wheel is an Omni wheel.

7. The device of claim 1, wherein the drive system comprises individual drive systems for each of the plurality of wheel sets.

8. The device of claim 1, wherein the attachment mechanism comprises:
   a plurality of suction cups positioned on the underside of the platform; and
   a vacuum system coupled to the plurality of suction cups.

9. The device of claim 1, wherein the sensors are magnetoresistive and can measure and divide an output field strength into X, Y & Z components.

10. The device of claim 1, wherein the drill assembly comprises:
    a drill spindle;
    a spindle motor; and
    wherein a drill feed motor is coupled to the drill feed assembly.

11. A portable device for use in product assembly comprising:
    a platform;
    a plurality of wheel sets coupled to the platform, the plurality of wheel sets engaging and moving the portable device along a surface to be drilled;
    a drive system for driving the plurality of wheel sets;
    an attachment mechanism for securing the device to the surface for an assembly operation;
    a plurality of sensors for finding a location on the surface where the assembly operation is to be performed based on detection of at least one magnet positioned under the surface;
    a control board for controlling operating of the device wherein the control board receives target signals and moves the portable device to a target drill location on the surface the control board adjusting a position of the drive table based on readings from the sensors; and
    a normality system for adjusting an angle between the platform and the surface where the assembly operation is to be performed.

12. The device of claim 11, wherein the normality system comprises:
    a pivot angle measuring device;
    a control unit coupled to the pivot angle measuring device; and
    a normality motor coupled to the control unit for raising and lowering a portion of the platform.

13. The device of claim 12, wherein the normality system has a plurality of multi-core processors, wherein each core of each processor is programmed to perform a specific function.

14. The device of claim 12, wherein the plurality of sensors is magnetoresistive and can measure and divide an output field strength into X, Y & Z components.

15. The device of claim 11, wherein the plurality of wheel sets are Omni wheel sets.

16. The device of claim 9, wherein the drive system comprises individual drive systems for each of the plurality of wheel sets.

17. The device of claim 11, wherein the attachment mechanism comprises:
    a plurality of suction cups positioned on the underside of the platform; and
    a vacuum system coupled to the plurality of suction cups.

18. A portable device to drill holes comprising:
    a platform;
    a plurality of wheel sets coupled to the platform, the plurality of wheel sets engaging and moving the portable device along a surface to be drilled;
    a drive system for driving the plurality of wheels;
    an attachment mechanism positioned on an underside of the platform for securing the device to the surface;
    a control board for controlling operating of the device;
    a drill assembly coupled to the platform;
    a drill feed assembly coupled to the drill assembly for raising and lowering the drill spindle assembly;
    a drive table for positioning the drill assembly in an XY plane;

a power supply for powering the device;
an antenna coupled to the control board for sending location information and receiving drill locations;
sensors for finding magnet locations;
a normality system for adjusting an angle between the platform and the surface to be drilled, the normality system including:
  a pivot angle measuring device;
  a control unit coupled to the pivot angle measuring device; and
  a normality motor coupled to the control unit for raising and lowering a portion of the platform
wherein the control board receives target signals and moves the portable device to a target drill location on the surface, the control board adjusting a position of the drive table based on readings from the sensors.

* * * * *